Sept. 15, 1964  G. PEDRETTI ETAL  3,149,199
ELECTRICAL CONDUCTORS AND CABLES FOR USE IN HIGHLY REACTIVE
MEDIA AND INSULATED WITH A VULCANIZED POLYOLEFIN
Filed April 5, 1960
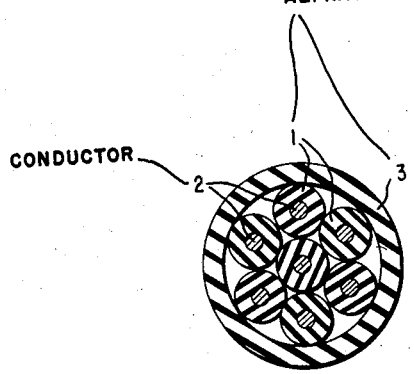
VULCANIZED SATURATED AMORPHOUS ELASTOMERS OF ETHYLENE AND ALPHAOLEFIN COPOLYMERS
CONDUCTOR
GIOVANNI PEDRETTI
GIORGIO PELLICCIARI
LUIGI CORBELLI
   INVENTORS
BY *Bertram Bradley*
   ATTORNEY

United States Patent Office 3,149,199
Patented Sept. 15, 1964

3,149,199
ELECTRICAL CONDUCTORS AND CABLES FOR USE IN HIGHLY REACTIVE MEDIA AND INSULATED WITH A VULCANIZED POLYOLEFIN
Giovanni Pedretti, Ferrara, Giorgio Pellicciari, Milan, and Luigi Corbelli, Ferrara, Italy, assignors to Montecatini Società Generale per l'Industria Mineraria e Chimica, Milan, Italy
Filed Apr. 5, 1960, Ser. No. 20,014
Claims priority, application Italy Apr. 8, 1959
7 Claims. (Cl. 174—113)

The present invention relates to the production of electric conductors and cables for low, average, or high intensity currents and for low or high voltages, which conductors and cables may be used in the presence of highly reactive media, e.g., in contact with or in the presence of acids, bases, or oxidizing materials and/or at relatively high temperatures.

As is well known, an electric cable usually consists of one or more electric conductors (generally of copper) coated with an insulation layer and covered with a protective sheath. The sheath should be resistant to mechanical stresses in order to protect the insulation between the conductors from the action of the external atmosphere and from contact with chemically reactive substances capable of degrading its electro-mechanical characteristics.

The protective sheath and the insulating coatings of the conductors should exhibit high flexibility and shear strength, should be easy to extrude and, furthermore, should be resistant to high temperatures and to attack by reactive substances located in the vicinity where the cable is placed. These general requirements prevail for e.g., conductors for windings of static or rotating machines situated in reactive media or at high temperatures, or for cables used in the electrification of mines, in chemical plants, etc. In addition, for all cable that is to be laid underground or in underground passages, an outer layer of lead should be provided for protection.

Heretofore, materials used for cables and conductors included vulcanized natural rubber, guttapercha, various synthetic rubbers, as well as such plastics as polyethylene and polyisobutene. While certain of these materials offered certain specific advantages in particular instances, e.g., the use of polyethylene for submarine cables for telecommunications, such materials have been unsuitable for application on a large scale. Although such materials will, in some cases, offer very good mechanical characteristics, in other cases they do not provide adequate thermal and chemical resistance, so that they do not ensure durable long-life service when installed in particularly reactive media or at high temperatures.

Many attempts have been made to overcome the above difficulties, as by using various mixtures of the prior-art materials or by various treatments to improve the material's resistance to chemical action and to high temperatures. However, such attempts have been cumbersome and expensive, and have generally failed to solve the problem from the technical and/or economic point of view.

Accordingly, it is an object of our invention to provide novel insulating compositions which offer very good properties of electrical, mechanical, thermal, and chemical resistance. Additional objects will become apparent hereinafter.

We have found that substantial advantages are obtained in the production of bipolar, tripolar, or more complex electric cables and in the insulation of conductors or by twin conductors for any voltage and current intensity, these cables (as seen in cross-section in the figure) and conductors to be used in highly reactive media or in contact with acidic, basic, or oxidizing materials and/or at high temperatures, by using for both the insulation (1 of the figure) of the conductor (2 of the figure) or of the single conductors and for the protective sheath (3 of the figure) of the cable, an elastomer obtained by the vulcanization of an amorphous saturated copolymer of ethylene with an alpha-olefin. We have found a copolymer of ethylene with propylene and/or butene to be particularly suitable.

Copolymers of ethylene with alpha-olefins, more particularly of ethylene with propylene and/or butene are described in the Italian Patents No. 554,803 issued January 16, 1957 and No. 581,418 issued August 27, 1958 to applicants. They may be produced by copolymerizing the desired monomers in an organic solvent under low pressure and in the presence of a suitable catalyst. This catalyst may be obtained as the reaction product of a compound soluble in an organic solvent, this compound having as the cation a transition metal selected from the 4th, 5th or 6th group of the periodic table, with an alkyl metal compound of a metal selected from the 2nd or 3rd group of the periodic table.

More particularly, the best results are obtained by using a catalytic system consisting of the reaction product of a hydrocarbon-soluble vanadium compound such as, e.g. vanadium halides, oxyhalides, acylacetonates, alcoholates and an aluminum organic compound such as, e.g. aluminum trialkyls, dialkylmonohalides, monoalkyldihalides and mixtures thereof. As examples of the above system, may be mentioned:

vanadium oxychloride-trihexyl aluminum
vanadium tetrachloride-diisobutyl aluminum chloride
vanadium acetylacetonate-diethyl aluminum chloride
vanadium tetraisopropylate-diethyl aluminum chloride.

The polymerization is carried out at 20°–100° C. in the presence of a hydrocarbon solvent such as, e.g. pentane, cyclohexane and toluene.

According to our Italian Patent No. 581,418 issued on August 27, 1958, the more suitable copolymers of ethylene with propylene are preferably obtained by reacting the monomers in the complete absence of any solvent at a temperature of from about +30° to −100° C. under such conditions that the monomer mixture is in the liquid state in the polymerization autoclave, the reaction being carried out in the presence of a catalyst that is the reaction product of a metal alkyl wherein the metal is selected from the 1st, 2nd, or 3rd group of the periodic table, with transition metal compound wherein the metal is selected from the 4th, 5th or 6th group of the periodic table.

Elastomers of the aforementioned olefin copolymers may be prepared by heating the copolymer to from about 180° to 300° C., with from about 1–15% sulfur or a sulfur-donor substance, until a homogeneous spongy mass is obtained and then vulcanizing this mass, either alone or in admixture with a natural or synthetic rubber. It is preferred to mix the copolymer with from about 0.5 to 10% of a free radical generator such as an organic peroxide or perester, from about 0.1 to 3% sulfur and, if desired, with a quinone compound, and to heat the mix to a temperature from about 140° to 160° C. The peroxide may be an alkyl- aryl, or acyl peroxide.

Our saturated copolymers and the vulcanized elastomers obtained therefrom which are employed in the cables according to the invention, are products completely new in the art. They differ from the traditional copolymers and elastomers due to a combination of structural and physicochemical characteristics. It has therefore surprisingly been found that they can profitably be used for both the insulating layer of the conductors and also for the external protective sheath.

Some of the substantial advantages of our copolymers may be set forth as follows:

(a) The copolymers offer very good electrical characteristics and a very low ash content (free of hydroscopic ashes);

(b) The mixes based on an ethylene-propylene copolymer are not damaged by the contact with copper, so that there is no need to "tin" the copper conductor;

(c) The vulcanized mixes are exceptionally resistant to heat, acids, and oxidants, including ozone. The above properties make it possible to use the cables under the most difficult conditions, even without the protection of outer lead layers;

(d) The mixes based on copolymers of ethylene-propylene or ethylene-butene can be prepared using the same fillers presently used for the traditional rubbers in the cable industry. The working, extrusion, and vulcanization are carried out with the usual techniques so that extruded cables vulcanized in autoclave or cables lined with lead can be produced without any modification of the usual apparatus;

(e) The electrical characteristics of the copolymer and of the insulating mix are very good.

From the copolymers thus obtained, which contain from about 10 to 80% ethylene and do not show any residual crystallinity at the X-rays, are completely soluble in carbon tetrachloride at room temperature, and have a molecular weight comprised between 50,000 and 500,000, which corresponds to an intrinsic viscosity in tetralin at 135° C. comprised between 0.6 and about 3.5, vulcanized elastomers may be prepared by treatments described in applicants' Italian Patents No. 600,723 issued on December 15, 1959, No. 583,502 issued on October 14, 1958, No. 582,002 issued on December 15, 1959, No. 587,009 issued on January 2, 1959 and No. 587,681 issued on January 20, 1959. More particularly, they can be prepared by vulcanization of the copolymer with an unsaturated organic compound containing in the molecule one or more functional groups of an acid nature, in the presence of a free radical generator and preferably by adding to the vulcanization mixture a basic polyfunctional substance such as a metal oxide.

Characteristics of the copolymer ethylene-propylene ($C_2$–$C_3$) at 22° C.:

Dielectric constant _____ 1.8.
Loss factor _____ 0.0015.
Dielectric rigidity (strength) _____ 28 kvolt/mm.
Volume resistivity _____ $2 \times 10^{16}$ ohm.

Characteristics of the ethylene-propylene insulating mix at 22° C.:

Dielectric constant _____ 2.4.
Loss factor _____ 0.03.
Dielectric rigidity (strength) _____ 26 kvolt/mm.
Volume resistivity _____ $2 \times 10^{14}$ ohm.

Characteristics of the copolymer ethylene-butene ($C_2$–$C_4$) at 22° C.:

Dielectric constant _____ 2.2.
Loss factor _____ 0.0018.
Dielectric rigidity (strength) _____ 27.5 kvolt/mm.
Volume resistivity _____ $1.5 \times 10^{16}$ ohm.

Characteristics of the ethylene-butene insulating mix at 22° C.:

Dielectric constant _____ 2.4.
Loss factor _____ 0.035.
Dielectric rigidity (strength) _____ 26 kvolt/mm.
Volume resistivity _____ $2 \times 10^{14}$ ohm.

The various features and advantages of our invention will be further illustrated by the following examples. All parts are by weight unless otherwise indicated.

Example 1

Tripolar cables ($3 \times 16$ mm.$^2$) have been prepared with the following mixes:

| | Mix from ethylene-propylene ($C_2$–$C_3$) | Mix from ethylene-butene ($C_2$–$C_4$) |
|---|---|---|
| Insulating mix for the single conductors: | | |
| Copolymer | 100 | 100 |
| Calcinated alumina | 100 | 100 |
| MgO | 2 | 2 |
| PbO | | 2 |
| Tert. butylperoxide tetrachloride | 4 | 4 |
| Sulfur | 0.5 | 0.5 |
| Each mix exhibited the following mechanical properties: | | |
| Tensile strength, kg./cm.$^2$ | 75 | 70 |
| Elongation at break, percent | 350 | 350 |
| Modulus of elasticity at 300 percent, kg./cm.$^2$ | 37 | 33 |
| Mix for external sheath: | | |
| Copolymer | 100 | 100 |
| Carbon black, Fe$_2$ | 70 | 70 |
| MgO | 2 | |
| PbO | | 2 |
| Tert. butyl peroxide tetrachloride | 4 | 4 |
| Sulfur | 0.5 | 0.5 |
| Each mix exhibited the following properties: | | |
| Tensile strength, kg./cm.$^2$ | 175 | 160 |
| Elongation at break, percent | 390 | 360 |
| Modulus of elasticity at 300 percent, kg./cm.$^2$ | 98 | 90 |

In the above mixes the stabilizers against ageing were intentionally excluded in order to illustrate only the resistance properties of the copolymers. The addition of such stabilizers further improves said properties.

Three conductors were coated with the first mix by operating in an extruder at about 100° C. with a speed of 25 meter/minute and by continuously vulcanizing the copolymer in a tube in which direct vapor was introduced under a pressure of 15 atm. The conductors were covered with an insulating layer the thickness of which was 1 mm. The three conductors prepared as described above and arranged according to the art, were coated with the sheath mix, using a technique usually employed in the electric cable industry and similar to that described above.

The cable thus obtained was subjected to a test voltage of 4000 volts between the conductors and between the cable and the earth. Four cable pieces were subjected to the following ageing tests:

(1) A sample from each copolymer-mix was immersed (while protecting the copper ends) in cold 68% nitric acid for 30 days. After this treatment the sample did not show any trace of damage to its appearance. The cable withstood positively a test voltage of 4000 volts between the conductors and between the cable and the earth. The external sheath and the insulating coating of the single conductor were removed from the conductors and were subjected to dilatometric test, thereby obtaining the following results:

| | Mix from ethylene-propylene ($C_2$–$C_3$) | Mix from ethylene-butene ($C_2$–$C_4$) |
|---|---|---|
| External sheath: | | |
| Tensil strength, kg./cm$^2$ | 98 | 86 |
| Elongation at break, percent | 500 | 450 |
| Modulus of elasticity at 300%, kg./cm$^2$ | 75 | 70 |
| Insulating coating: | | |
| Tensil strength, kg./cm.$^2$ | 58 | 54 |
| Elongation at break, percent | 620 | 600 |
| Modulus of elasticity at 300%, kg./cm.$^2$ | 28 | 26 |

(2) A piece of each cable was immersed in cold 98% sulfuric acid for 30 days. After this treatment the cable gave a positive result when treated by applying 4000 volts either between the conductors two by two, or between the cable and the earth. The mechanical properties of the rubber portion removed from the cable were as follows:

|  | Mix from ethylene-propylene (C₂-C₃) | Mix from ethylene-butene (C₂-C₄) |
|---|---|---|
| External sheath: | | |
| Tensil strength, kg./cm.² | 85 | 75 |
| Elongation at break, percent | 560 | 520 |
| Modulus of elasticity at 300% kg./cm.² | 68 | 58 |
| Insulating coating: | | |
| Tensil strength, kg./cm.² | 48 | 45 |
| Elongation of break, percent | 600 | 620 |
| Modulus of elasticity at 300%, kg./cm.² | 26 | 23 |

(3) Each cable under examination was placed in a vented oven at 120° C. for 8 days. After this treatment the outer surface of the sheath appeared to be slightly tacky but still maintained a very good consistency. Each cable withstood the test voltage of 4000 volts between the conductors two by two, and between the cable and the earth. The rubber portions forming the sheath and the insulating coating were subjected to mechanical tests, and gave the following results:

|  | Mix from ethylene-propylene (C₂-C₃) | Mix from ethylene-butene (C₂-C₄) |
|---|---|---|
| External sheath: | | |
| Tensile strength, kg./cm.² | 50 | 42 |
| Elongation at break, percent | 650 | 630 |
| Modulus of elasticity at 300%, kg./cm.² | 28 | 21 |
| Insulating coating: | | |
| Tensile strength, kg./cm.² | 48 | 40 |
| Elongation at break, percent | 600 | 580 |
| Modulus of elasticity at 300%, kg./cm.² | 18 | 15 |

In the above description reference has been made in particular to electrical cables and conductors. It is, however evident, that our elastomers can be applied for the insulation and protection of other electrical equipment, such as e.g., condenser, coils, resistors, windings for transformers, switches, etc. Further, although the above examples relate to elastomers vulcanized with peroxides, it is understood that this is only illustrative of one of the various vulcanization treatments for copolymers of ethylene with alpha-olefins.

It will be further understood that our invention finds application not only for copolymers of ethylene and propylene but also for copolymers of ethylene with other alpha-olefins, such as e.g., butene.

Variations can, of course, be made without departing from the spirit of our invention.

Having thus described our invention, what we desire to secure and claim by Letters Patent is:

1. An electrical cable comprising a plurality of individually coated conductors and an external sheath, said coating and said sheath comprising a vulcanized elastomer obtained by the vulcanization using a peroxide and sulfur of a saturated amorphous copolymer of ethylene and an alpha-olefin containing from about 10% to 80% of ethylene, this copolymer having been produced in the presence of a coordination catalyst obtained from an organometallic compound and a transition metal.

2. The electric cable of claim 1, wherein the alpha-olefin is propylene.

3. The electric cable of claim 1, wherein the alpha-olefin is butene.

4. The electric cable of claim 1, wherein the coating of the conductors and the external sheath of the cable are obtained by continuous extrusion and vulcanization in an autoclave.

5. An electrical conductor coated with a vulcanized elastomer obtained by the vulcanization using a peroxide and sulfur of a saturated amorphous copolymer of ethylene and an alpha-olefin containing from about 10% to 80% of ethylene, this copolymer having been produced in the presence of a coordination catalyst obtained from an organometallic compound and a transition metal.

6. The conductor of claim 5, wherein the alpha-olefin is propylene.

7. The conductor of claim 5, wherein the alpha-olefin is butene.

References Cited by the Examiner
UNITED STATES PATENTS

| 1,982,288 | 11/34 | Evans | 174—113 |
| 2,921,872 | 1/60 | McGlamery | 252—63 |
| 2,935,109 | 5/60 | Railsback | 174—110 |

FOREIGN PATENTS

| 777,538 | 6/57 | Great Britain. |
| 810,024 | 3/59 | Great Britain. |

UNITED STATES PATENT OFFICE
CERTIFICATE OF CORRECTION

Patent No. 3,149,199            September 15, 1964

Giovanni Pedretti et al.

It is hereby certified that error appears in the above numbered patent requiring correction and that the said Letters Patent should read as corrected below.

Column 2, line 62, for "alkyl-" read -- alkyl, --; column 4, Example 1, line 20, for "$Fe_2$" read -- FEF --.

Signed and sealed this 12th day of April 1966.

(SEAL)
Attest:

ERNEST W. SWIDER            EDWARD J. BRENNER
Attesting Officer            Commissioner of Patents